June 28, 1955  J. H. HICKEY  2,711,594
PILOT TRAINING DEVICE
Filed May 28, 1953  3 Sheets-Sheet 1

INVENTOR
JOHN H. HICKEY
BY
ATTORNEY

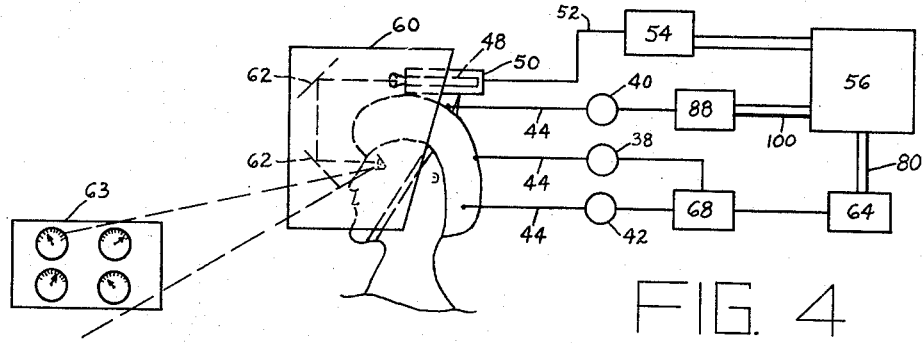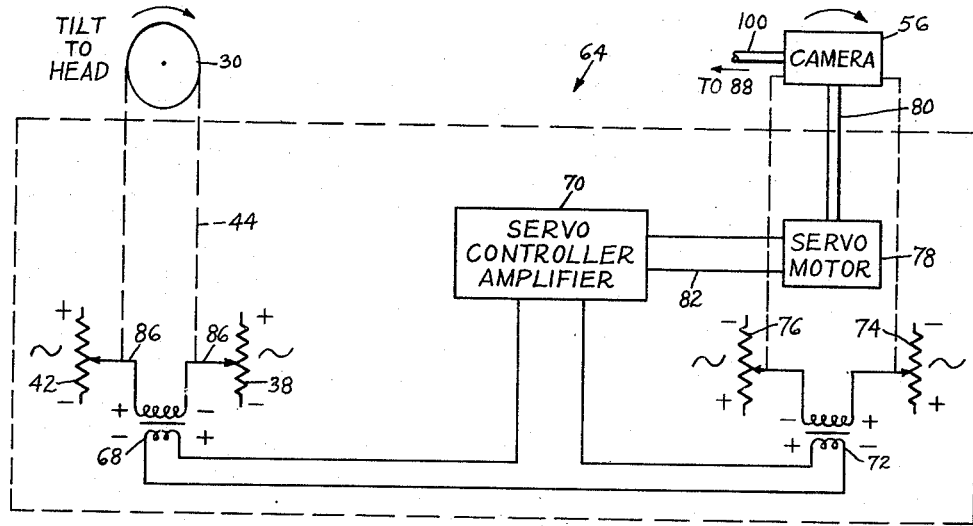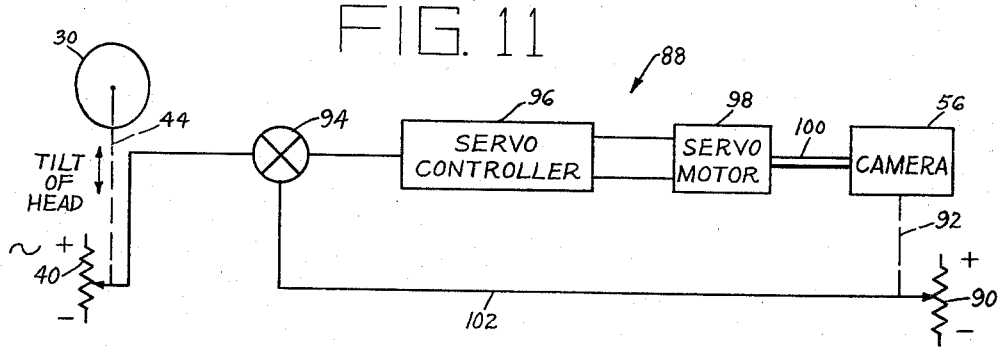

June 28, 1955  J. H. HICKEY  2,711,594
PILOT TRAINING DEVICE
Filed May 28, 1953  3 Sheets-Sheet 3
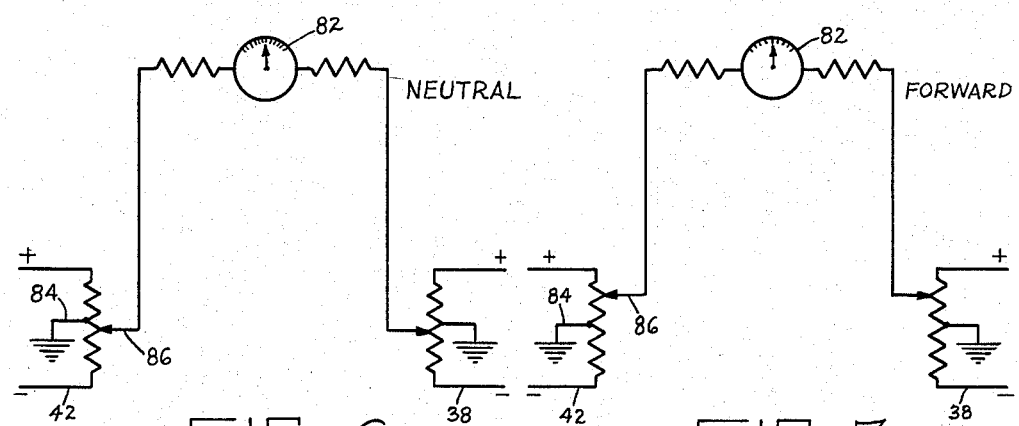
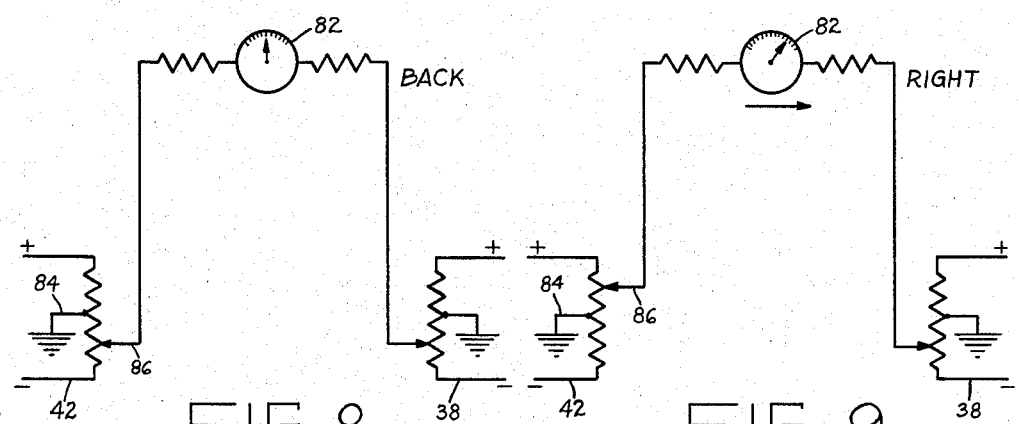
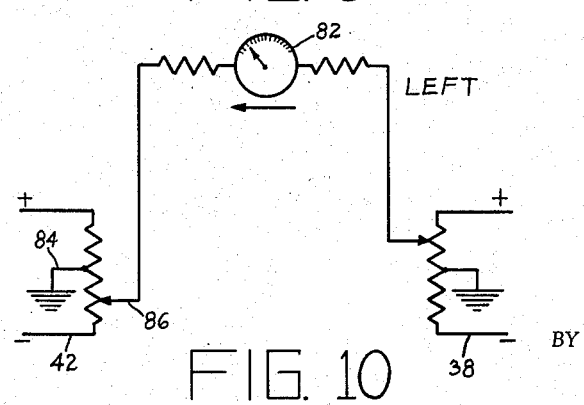
INVENTOR
JOHN H. HICKEY
BY
ATTORNEY United States Patent Office 2,711,594
Patented June 28, 1955

2,711,594

PILOT TRAINING DEVICE

John H. Hickey, Port Washington, N. Y.

Application May 28, 1953, Serial No. 358,217

9 Claims. (Cl. 35—12)

(Granted under Title 35, U. S. Code (1952), sec. 266)

The invention described herein may be manufactured and used by or for the Government of the United States of America for governmental purposes without the payment of any royalties thereon or therefor.

The invention relates to improvements in devices for training pilots to fly airborne machines.

An object of the invention is to provide training for pilots without requiring them to leave the ground.

Another object is to simulate all situations apt to be encountered by a pilot while in flight so that he may be taught how to avoid or overcome such conditions without the danger of crashing while learning.

Still another object resides in simulating conditions so realistically that the pilot will feel that he is actually within such environment.

A more specific object resides in the provision of means for automatic coordination between the movements of a miniature machine over a model terrain and what the student pilot would see if he were actually in the machine while it is in operation.

Another specific object is to provide a television camera and a picture receiving means to enable the student pilot to see terrain below the miniature flying machine model as if he were seated in the machine itself.

A feature of the invention resides in the use of a servo system to transmit movement of the student pilot's head to a television camera mounted at a distant point so that the camera will view whatever portion of the terrain the pilot would be looking at as he turns his head from side to side.

Another feature of the invention is in the use of minute cathode ray tubes mounted in the pilot's helmet and coordinated with his head movement so that such movement will be transmitted to a camera mounted at a distant point. This enables him to see what normally would be visible from within the miniature model.

Other objects and many of the attendant advantages of this invention will be readily appreciated as the same becomes better understood by reference to the following detailed description when considered in connection with the accompanying drawings wherein:

Fig. 4 illustrates the closed circuit television equipment on the pilot's head;

Figs. 6, 7, 8, 9 and 10 illustrate schematically the flow of current when the pilot moves his head;

Fig. 11 illustrates the servo control system for the rotation of the pilot's head; and Fig. 12 illustrates the control system for the vertical movement of the pilot's head.

The invention is designed to train a pilot to fly without having him leave the ground during the training period. The device of the invention employs closed circuit television equipment and is used, preferably, with a miniature helicopter which is movable over a model terrain. The invention is particularly well adapted to be used with helicopter flying training, since helicopters are capable of various kinds of movements and attitudes not found in conventional aircraft and it is therefore difficult to provide a large grounded trainer or simulator. Obviously, the invention is capable of many other uses. For example, the device could be used in the training of pilots learning to fly fixed wing aircraft. The invention may be used to train persons to drive automobiles, or may be used to test the physical reactions of persons suddenly confronted with emergency conditions.

Figure 1:
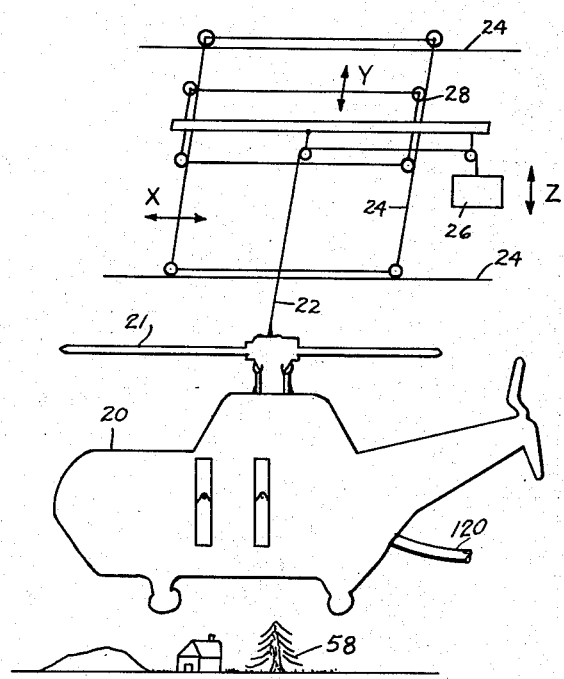
Fig. 1 illustrates a miniature helicopter used to teach pilots to fly, said helicopter being mounted for travel on an overhead trackway.
Figure 2:
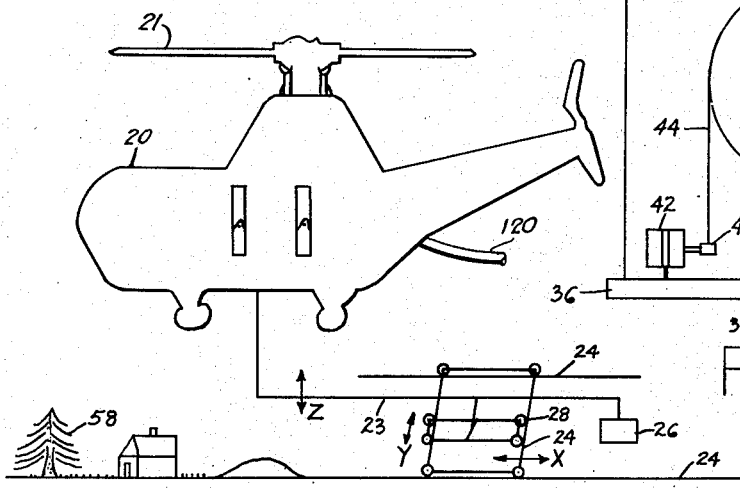
Fig. 2 illustrates a modification, showing a miniature helicopter for teaching pilots to fly, said helicopter being mounted on a boom suspension means.

The pilot 10 sits in a separate cockpit which is connected to miniature helicopter 20, illustrated in Figs. 1 and 2, and operates a control stick 12 to simulate flight conditions. The usual safety belt 14 and safety strap 16 is adapted to keep him in seat 18. Movement of control stick 12 actuates the model helicopter to various positions and locations and helicopter 20 reacts to the control movement in the same manner as a real helicopter. The actuation of the helicopter is conventional and is controlled by cable means 120 connecting helicopter 20 and the pilot's compartment. Motion is converted by conventional stick and throttle controls through conventional levers, gears or electrical means contained in a housing 130. Thus, cable 120 houses the control lines for actuating the control surfaces of helicopter 20 and the motor speed to turn rotor 21. Typical Bowden cable controls are illustrated in Patent Number 2,657,476 granted to R. L. Holcombe on November 3, 1953. An electrical type of remote controls is shown in Patent Number 2,485,266, granted to M. W. Edinburg on October 18, 1949. The craft is mounted for movement in any convenient manner. The craft will move along the X, Y and Z axes according to the extent of movement of the controls. The craft 20 can be suspended from an overhead carriage at 22, as shown in Fig. 1, or can be boom mounted, as shown in Fig. 2 at 23. Trackways 24, as well as weights 26 and pulleys 28, make motion of the miniature craft prompt and exact. The television camera can be mounted in the helicopter or at some other point, as desired, depending on the size of the training device.

Since the pilot does not sit in the miniature aircraft, some means must be provided to enable him to see what would normally be visible from the helicopter. The invention is designed to correlate the movement of the pilot's head with the camera so that he will see the terrain exactly as if he were actually seated in the helicopter.

Figure 3:
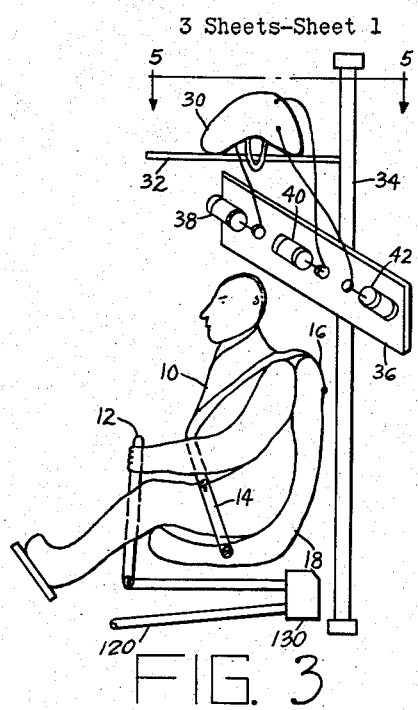
Fig. 3 illustrates the pilot seated in the separate cockpit with the television equipment ready for use.
Figure 5:
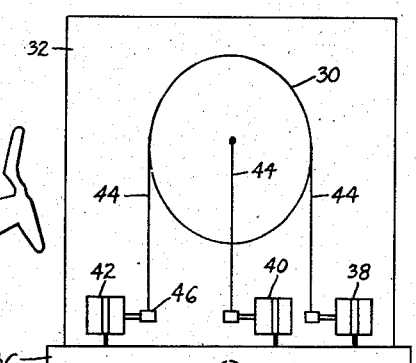
Fig. 5 is a plan view of the helmet and potentiometer controls as viewed on line 5—5 of Fig. 3.

Referring to Figs. 3, 4 and 5, a modified helmet 30 is retained on a platform 32 secured to a vertical pole 34 positioned behind the pilot's back. A potentiometer mounting plate 36 is also secured to vertical pole 34 and secures a plurality of potentiometers 38, 40 and 42. Potentiometers 38 and 42 are designed for servoing the head rotation of the pilot, whereas potentiometer 40 servos forward and rearward motion of the pilot's head. All of the potentiometers are operated by spring loaded cords 44 fastened to the potentiometer shafts 46. The cords of potentiometers 38 and 42 are fastened to corresponding positions at the sides of helmet 30 and the cord of potentiometer 40 is secured to the top of the helmet at the axis of rotation to avoid any pulling action when the pilot turns his head.

Also mounted on helmet 30 is a cathode ray tube 48 shielded at 50. Cathode ray tube 48 will preferably be about one inch in size, although tubes of other dimensions can be substituted, as desired. Picture tube 48 is connected by cable 52 to a monitor 54, which monitor is connected with a television camera 56 mounted in a model helicopter or at some other point and viewing a terrain model such as that illustrated at 58 in Figs. 1 and 2.

An optical system support 60 is adapted to be fitted over the eyes of pilot 10 (see Fig. 4) and contains reflecting mirrors 62 to deviate the optical axis of the projected picture. Support 60 is of any suitable transparent material and mirror 62 opposite the pilot's eye can be of the half-silvered type to enable light to be reflected through for him to see the simulator cockpit 63. Support 60 can be secured to the helmet permanently to be used as a unit, or can be removably attached after helmet 30 is placed in position on the pilot's head.

Movement of the head will operate the potentiometers, as will soon be made clear. The direction of current flow is used to servo the head motions to an object, such as camera 56. Rotation of the head of the pilot causes potentiometers 38 and 42 to turn while forward and backward movement of his head operates potentiometer 40.

Figs. 6 to 10 illustrate schematically the operation of the potentiometers for rotation of the head. Potentiometers 38 and 42 are in series with an indicator 82. A center tap ground 84 is provided as well as movable contact arms 86 at the pivot ends of the potentiometers. When the pilot moves his head forward and back, or looks straight ahead, indicator 82 shows no potential difference. When the pilot turns his head towards the left or to the right, current flows in the direction of the arrows from the high potential toward the low potential. The direction of current flow is used to servo the head movement to camera 56 viewing terrain model 58. A similar arrangement is provided for the forward and rearwad motion of the head.

Any suitable servo system 64 can be connected to potentiometers 38 and 42. The system illustrated in Fig. 11 is connected with the pilot's head by means of cords 44 attached to the potentiometers. The primary windings of transformer 68 are connected to the potentiometers, while the secondary windings are connected to servo controller amplifier 70 and to the secondary windings of a second transformer 72. The primary winding of the latter transformer connects to potentiometers 74 and 76 of television camera 56. Servomotor 78 is connected to camera 56 by shaft 80 and is also connected to servo controller 70 at 82.

Referring to Fig. 11, the pilot can move his head to the right as indicated by the arrow. This motion causes movable contact arm 86 of potentiometer 42 to become more positive and the arm of potentiometer 38 to become more negative, as illustrated.

A common source of A. C. current supplies the power to potentiometers 38 and 42 in Fig. 9. As an arbitrary starting basis, the contact arm of potentiometer 42 is designated as positive with the arm of potentiometer 38 as being negative. The output coil of transformer 68 is therefore negative for potentiometer 42 and is positive for potentiometer 38. Output of the transformer connected to camera 56 is at the same time positive for potentiometer 76 and is negative for potentiometer 74. The input coil is correspondingly negative at 76 and positive at 74.

Ordinarily, the potentiometers connected to the pilot's helmet 30 are balanced in relation to the potentiometers connected to camera 56. Assuming the pilot turns his head to the right, as illustrated in Fig. 11, cords 44 move arms 86 so that potentiometer 42 becomes more positive and potentiometer 38 becomes more negative. This causes a signal to flow through servo controller 70, since there is now a difference in voltage between transformers 68 and 72. Servomotor 78, connected to camera 56, now operates to turn the camera towards the right. Movement of camera 56 causes the arm of potentiometer 76 to become more negative and potentiometer 74 to become more positive. As a result, a current is induced at transformer 72 which bucks the current flowing from transformer 68 and when the potentials of the two transformers are equalized no error signal enters servo controller 70 and motor 78 is deenergized. Camera 56 is now in the same position as the pilot's head.

Referring to Fig. 12, potentiometer 40 is connected to a feed back balance network 88, to transfer the tilt of the head of the pilot to the camera. Potentiometer 40 is positive and potentiometer 90, connected to camera 56 at 92, is also positive. Ordinarily, or in the neutral position of the pilot's head, potentiometers 40 and 90 are balanced and no signal flows. Assuming the pilot moves his head forward or downward, a difference in potentials occurs since potentiometer 40 now becomes more positive and a voltage is induced. An error detector or voltmeter 94 signals servo controller 96 and servomotor 98 is actuated. Cable connection 100 between motor 98 and camera 56 causes the camera to tilt forward. This causes potentiometer 92 to become more positive. The signal produced is fed back to error detector 94 by means of line 102 until the induced voltage is equalized and camera 56 will have duplicated the position of the pilot's head.

The method used as described above to servo the camera is merely exemplary, and various other methods to obtain the same results can be employed within the scope of the invention.

Any movement of the pilot's head is thus transmitted to the camera to move the camera in the same direction over the terrain below. The image is transmitted back to the pilot by means of the optical system 48 and 62 so that the same effect is obtained as if he were actually seated in the helicopter, or other training device. He is then able to solve the problem without danger of accident or injury in the event he makes a wrong decision.

Obviously many modifications and variations of the present invention are possible in the light of the above teachings. For instance, the visual presentation can be projected on a screen with the projector and camera both being simultaneously servoed from the pilot's head motions. It is therefore to be understood that within the scope of the appended claims the invention can be practiced otherwise than as specifically described.

What is claimed is:

1. A remote control device for transmitting an image to a trainee comprising, a head covering adapted to be worn by the trainee, potentiometers operatively connected with said head covering, a camera, servo means connected to said potentiometers and camera, and optical means connected to said camera and head covering to transmit a picture from the camera to the trainee.

2. A remote control device for transmitting an image to a trainee comprising, a helmet adapted to be worn by the trainee, a potentiometer including a shaft, cord means secured to said shaft and terminating on said helmet to turn the shaft upon movement of the helmet, a camera, means connected to said camera and potentiometer to move the camera in synchronization with the potentiometer, and relay means from said camera to said helmet to transmit a picture.

3. A remote control device for transmitting an image to a trainee comprising, a helmet adapted to be worn by the trainee, a first potentiometer including a shaft, a second potentiometer including a shaft, cord means secured to said shafts and terminating on said helmet to turn the shafts upon movement of the helmet, a camera, means connected to said camera and potentiometers to move the camera in synchronization with the potentiometers, a picture tube mounted on said helmet and means connected to said camera and picture tube to transmit a picture from the camera to the tube.

4. A remote control device for transmitting an image to a trainee comprising, a helmet adapted to be worn by the trainee, a first potentiometer including a shaft, a second potentiometer including a shaft, cord means secured to said shafts and terminating on said helmet to turn the shafts upon movement of the helmet, a camera, means connected to said camera and potentiometers to move the camera in synchronization with the potentiometers, a picture tube mounted on said helmet, means to deflect a picture from said tube to within the trainee's vision, and means connected to said camera and picture tube to transmit a picture from the camera to the tube.

5. The combination of claim 4 wherein said picture tube and deflecting means are received within a transparent support, said support being secured on said helmet.

6. In a training device, a miniature helicopter movable on the X, Y, and Z axes, a camera mounted in said helicopter, a head covering adapted to be worn by a trainee, resistance means connected to said head covering and adapted to be operated by a trainee, servo means connecting said resistance and camera to synchronize the movements of the trainee with the camera and relay means connected with said camera to transmit a picture from the camera to the trainee.

7. The combination of claim 6 wherein said helicopter is suspended from a trackway and means connected with said helicopter to move it on the X, Y, and Z axes.

8. The combination of claim 6 wherein said helicopter is suspended from a boom and means connected with said helicopter to move it on the X, Y, and Z axes.

9. A remote control device for transmitting an image to a trainee comprising, a head covering adapted to be worn by the trainee, a first potentiometer including a shaft, a second potentiometer including a shaft, cord means secured to said shafts and terminating on said head covering to turn the shafts upon movement of the head covering, a camera, servo means connected to the camera and potentiometers to move the camera in synchronization with the head covering, a picture tube mounted on said head covering, a monitor operative with said picture tube and means connecting said monitor and picture tube to transmit a picture to the camera.

References Cited in the file of this patent

UNITED STATES PATENTS

| | | |
|---|---|---|
| 2,215,365 | Vestergren | Sept. 17, 1940 |
| 2,485,266 | Edinburg | Oct. 18, 1949 |
| 2,516,069 | Newhouse et al. | July 18, 1950 |
| 2,532,662 | Miller | Sept. 26, 1950 |